(12) United States Patent
Uzelac et al.

(10) Patent No.: US 6,957,354 B2
(45) Date of Patent: *Oct. 18, 2005

(54) METHOD AND APPARATUS FOR REDUCING SUB-THRESHOLD OFF CURRENT FOR A REAL TIME CLOCK CIRCUIT DURING BATTERY OPERATION

(75) Inventors: Lawrence S. Uzelac, Aubura, CA (US); Andrew M. Volk, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 10/625,584

(22) Filed: Jul. 22, 2003

(65) Prior Publication Data

US 2004/0054940 A1 Mar. 18, 2004

Related U.S. Application Data

(63) Continuation of application No. 09/469,986, filed on Dec. 21, 1999, now Pat. No. 6,611,918.

(51) Int. Cl.$^7$ .............................. G06F 1/32; G06F 1/26
(52) U.S. Cl. ..................... 713/320; 713/300; 713/323; 713/324
(58) Field of Search ................................ 713/300, 320, 713/323, 324; 327/143; 326/83

(56) References Cited

U.S. PATENT DOCUMENTS

| 5,543,734 A | * | 8/1996 | Volk et al. ..................... 326/83 |
| 5,838,171 A | | 11/1998 | Davis |
| 5,883,423 A | * | 3/1999 | Patwa et al. ................ 257/532 |
| 5,886,550 A | * | 3/1999 | Kwon et al. ................ 327/143 |
| 5,909,140 A | | 6/1999 | Choi |
| 5,917,365 A | | 6/1999 | Houston |
| 6,191,470 B1 | | 2/2001 | Forbes et al. |
| 6,307,233 B1 | | 10/2001 | Awaka et al. |
| 6,373,321 B1 | | 4/2002 | Yamauchi et al. |
| 6,380,798 B1 | | 4/2002 | Mizuno et al. |
| 6,611,918 B1 | * | 8/2003 | Uzelac ...................... 713/320 |
| 6,715,090 B1 | | 3/2004 | Totsuka et al. |
| 2004/0158756 A1 | | 8/2004 | Tosuka et al. |

FOREIGN PATENT DOCUMENTS

| JP | 10189884 A | 7/1998 |
| KR | 10-1998-0004940 | 3/1998 |
| KR | 10-1999-0078182 | 10/1999 |

OTHER PUBLICATIONS

Anonymous, *Diode Battery Back–Up Switch*, IBM Technical Disclosure Bulletin, vol. 30, No. 2, Jul. 1, 1987, p. 895.

Muhammad M: Khellah and M.I. Emasry, *Power Minimization of High–Performance Submicron CMOS Circuits Using a Dual–Vd Dual–Vth (DVDV) Approach*, Proceedings 1999 International Symposium on Low Power Electronics and Design, Aug. 1999, ACM, pp. 106–108.

K. Roy, Leakage power reduction in low–voltage CMOS designs, Electronics, Circuits and Systems, 1998 IEEE International Conference, vol. 2, 1998, pp. 167–173.

Office Action received in Korean Patent Application No. 10/2002/7008020.

Office Action received in Chinese Patent Application No. 00817542.X.

International Preliminary Examination Report received in PCT/US00/42597.

International Search Report received in PCT/US00/42597.

\* cited by examiner

*Primary Examiner*—Lynne H. Browne
*Assistant Examiner*—James K. Trujillo
(74) *Attorney, Agent, or Firm*—Fish & Richardson P.C.

(57) ABSTRACT

A CMOS circuit for low leakage battery operation connects the real time clock to the power supply when available or to a low leakage source when the power supply is not available.

27 Claims, 2 Drawing Sheets

METHOD AND APPARATUS FOR REDUCING SUB-THRESHOLD OFF CURRENT FOR A REAL TIME CLOCK CIRCUIT DURING BATTERY OPERATION

PRIOR APPLICATION

This application is a continuation of U.S. patent Ser. No. 09/469,986, filed Dec. 21, 1999, now U.S. Pat. No. 6,611,918.

BACKGROUND

The present application teaches a circuit for use in reducing power consumption of a real time clock in a computer system.

When a personal computer is turned off, an on-board battery, e.g. a 3-volt lithium battery, may still power certain circuits in the computer. For example, a real time clock often still maintains the time using battery power when the primary computer power supply goes offline.

The smaller transistors that are now used to make such circuits in order to fit more transistors on a substrate, often have higher leakage currents. These transistors consume undesired current when they are biased to the "off" state. This increases the DC load that is placed on the battery, when the computer power supply is off due to off state current, which can cause the battery to deplete more quickly.

SUMMARY

The present disclosure defines a device which reduces power consumption during battery powered operation of the Real Time Clock.

The application discloses a leakage reduction device for a real time clock system, that has a real time clock circuit, having separated first and second power supply connections, and maintaining a count indicative of real time; and an associated circuit, which operates in a first mode when a power supply voltage is present and operates in a second mode when battery power is present, said second mode providing a biasing condition that minimizes off state leakage current during battery operation.

DESCRIPTION OF DRAWINGS

These and other aspects will be described in detail with reference to the accompanying drawings, wherein.

DETAILED DESCRIPTION

The present application describes reducing the undesired current flow through transistors in a clock circuit. In an embodiment, the transistors are MOS devices. The sub-threshold off current of these MOS devices is reduced by applying a voltage bias to the substrate relative to the gate, source and drain voltages. The relative device threshold voltage is then increased according to the relation $$\Delta V_t = \left[\frac{(2\varepsilon_0\varepsilon_{ox}qN_a)^{1/2}}{C_{ox}}\right] \cdot \left[(2\phi_f - V_{bias})^{1/2} - (2\phi_f)^{1/2}\right]$$

The sub-threshold off current is also reduced according to the relation $$I_{off} = I_o \cdot e^{\frac{q}{KT}((V_{gs}-(vt+\Delta V_t))/n)} \left(1 - e^{\frac{q}{KT}V_{DS}}\right)$$

with $$I_o = \frac{\mu_v C_{ox} W_{eff}}{L_{eff}} \cdot \left(\frac{KT}{q}\right)^2 e^{1.8}$$

Figure 1:
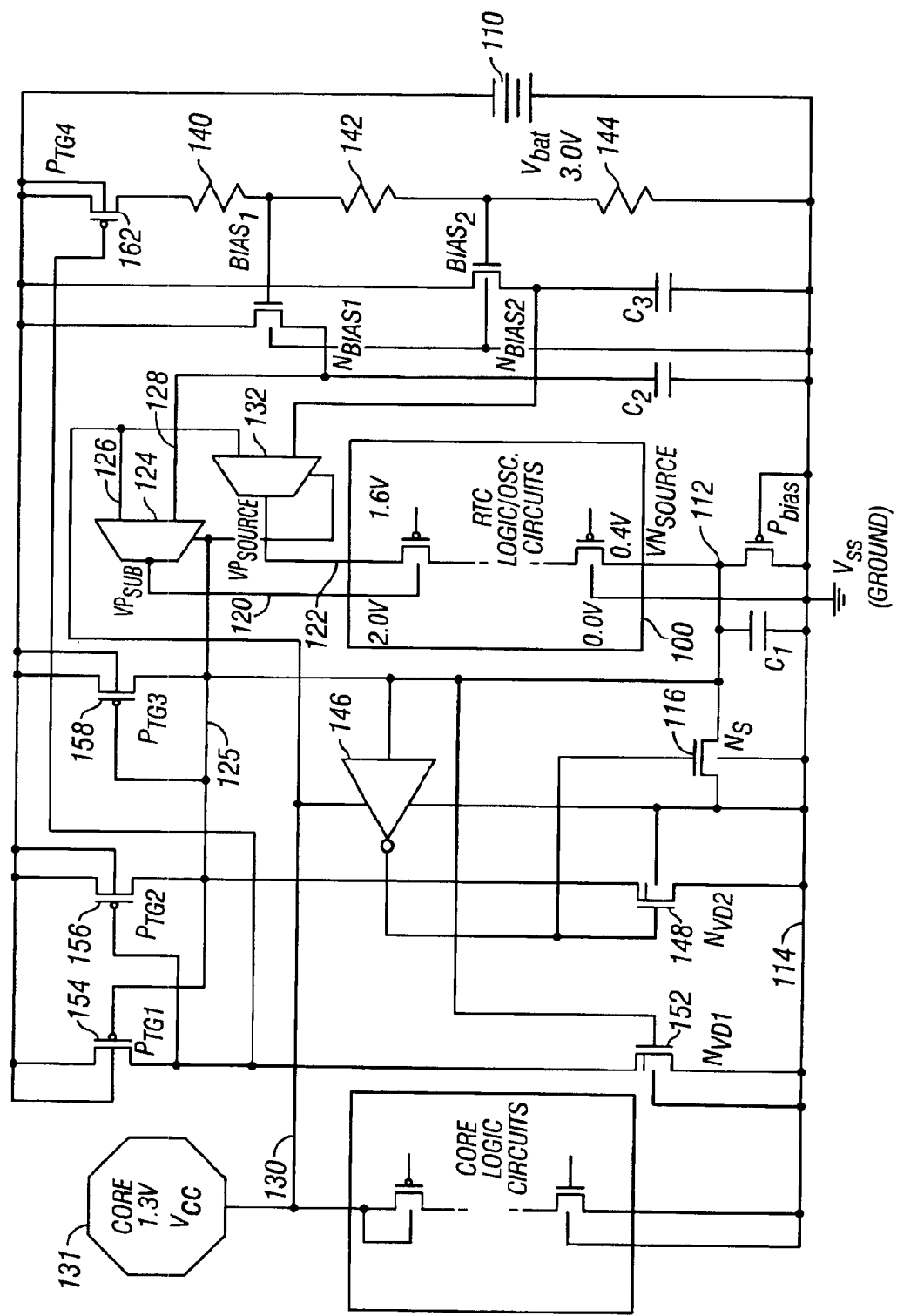
FIG. 1 shows a schematic diagram of the circuitry including the real time clock well.

A schematic diagram of a specific circuit, e.g., a computer chipset, is shown in FIG. 1. This circuit includes a real time clock circuit portion 100 that has separate power supply connections for the battery and for the wired power supply. The part that is always powered is separated from other circuits in the chip. The real time clock 100 is called the "RTC well" since it has the separate power supply connections. The separated connection enables battery 110, e.g., a 3.0 volt lithium battery, to be used to power the real time clock well while the remainder of the circuit is turned off.

An off-chip diode network has been used to isolate the battery from the computer's power supply once the computer is actually turned on.

The present application discloses circuitry forming a relative substrate bias which reduces the off current ($I_{off}$) of the real time clock circuit during battery operation. This is done by changing source voltage levels in the real time clock well when the main power supply is turned off.

Switching devices, described in more detail herein, are connected between the source and substrate connections of N-channel and P-channel real time clock devices in the well 100. This better isolates the substrate from the N-channel source connection and isolates the N well from the P-channel source connection during battery operation. These switches are in one state when primary chip power or "core power" is available. The switches are in another state when the primary chip power is off and the real time clock circuit 100 is powered by the battery 110. In this latter state, the bias voltage of the real time clock is raised to a level that decreases leakage. The real time clock logic continues to operate at the raised source voltage condition during the low-leakage battery operation.

The circuit and its control are illustrated in FIG. 1. The RTC well 100 has three power connection nodes. The $Vn_{source}$ power node 112 of the real time clock module 100 is controlled by N-channel switching transistor ($N_s$) 116. Energizing $N_S$ 116 selectively switches the $Vn_{source}$ node 112 to the $V_{ss}$ ground rail. When transistor 116 is deenergized, node 112 floats.

P-channel device well nodes of the real time clock include $Vp_{sub}$ 120, and $Vp_{source}$ 122. Multiplexers 124 and 132 control the power supplied to these nodes. These multiplexers can be thick-gate P-channel MOS devices. The $Vp_{sub}$ node is controlled by multiplexer 124. One input 126 to the multiplexer 124 is the core 1.3 volt power line 130 from power supply 131. The other input 128 to the multiplexer 124 is a power consumption-reducing bias level $N_{bias1}$. This bias level is formed by the biasing resistors 140, 142, 144 placed across the battery 110.

Analogously, the multiplexer 132 receives the core power supply 1.3 volts 130 at its one input, and a second bias level $N_{bias2}$ at the other input thereof.

These bias levels are selected to minimize the leakage. $Vp_{sub}$ (120) can be 2.0 volts, and $Vp_{source}$ (122) can be 1.6 volts.

Level shifting logic, including $N_{VD1}$ (152), $N_{VD2}$ (148), $P_{TG1}$ (154), and $P_{TG2}$ (156) control the switching of the multiplexers 124 and 132. When core power 130 is present, inverter 146 is enabled and controls the gate voltages of the n-channel devices $N_S$ 116 and $N_{VD2}$ 148.

In normal operation, when the power supply 131 is on, an output voltage is produced on line 130. The inserter 146 is enabled, producing a high output that pulls up the gate voltage of the devices $N_S$ 116 and $N_{VD2}$ 148. Biasing $N_{VD2}$ 148 turns on $N_S$ 116 and connects the N-channel source node $Vn_{source}$ to ground 114.

Biasing of $N_{VD1}$ 152 causes $P_{TG1}$ and $P_{TG2}$ to raise the multiplex control line 125, switching the multiplexer units 124, 132. This connects the nodes $Vp_{sub}$ and $Vp_{source}$ to the core 1.3 volt power 130.

When core power 130 is not available, the real time clock 100 operates under battery power. The output of $V_{TG3}$ 158 pulls up the input to the inverter 146, thereby lowering the output of the inverter 146, and turning off the gate of $N_{VD2}$ 148 and $N_S$ 116. $N_S$ 116 isolates $Vn_{source}$ from ground 114. The multiplexer units 124, 132 are also caused to switch, thereby connecting the real time clock nodes $Vp_{sub}$ 120 and $Vp_{source}$ 122 to the bias voltages $N_{bias1}$ and $N_{bias2}$, respectively. This also causes device $P_{TG4}$ 162 to turn on, to establish the bias levels $bias_1$ and $bias_2$ across the resistor ladder, 140, 142, 144 using battery power. The bias resistors should be larger than 10 M ohms, to minimize current flow from the battery.

This circuit even further conserves battery power since the bias resistors are isolated from the battery during non-battery operation.

As noted above, these bias values are selected as values that will allow the RTC logic and oscillator circuits in the well 100 to operate at low leakage current levels. Selected bias levels include $Vn_{source}$ at 0.4 volts, $Vp_{sub}$ at 2.0 volts and $Vp_{source}$ at 1.6 volts.

The circuits in the real time clock well should continue to operate at all times. Capacitors C1, C2, C3 are used to decouple any switching noise during the transition between the two modes of operation to prevent the registers from being corrupted during a transition between the normal operation and the low leakage battery-powered operation.

These capacitors have a value of, for example 10 pF. In summary, the on and off conditions of the circuits during the two modes of operation are listed below in Table 1.

TABLE 1

| 1.3 V Core Power ON: (normal operation) | | 1.3 V Core Power OFF: (low leakage operation) |
|---|---|---|
| $N_S$ | ON | OFF |
| $N_{VD1}$ | OFF | ON |
| $N_{VD2}$ | ON | OFF |
| $P_{TG1}$ | ON | OFF |
| $P_{TG2}$ | OFF | ON |
| $P_{TG3}$ | ON | OFF |
| $P_{TG4}$ | OFF | ON |
| $N_{bias1}$ | OFF | ON |
| $N_{bias2}$ | OFF | ON |
| $Vn_{source}$ | 0 V | 0.4 V |
| $Vn_{sub}$ | 0 V | 0 V |
| $Vp_{source}$ | 1.3 V | 1.6 V |
| $Vp_{sub}$ | 1.3 V | 2.0 V |

Figure 2:
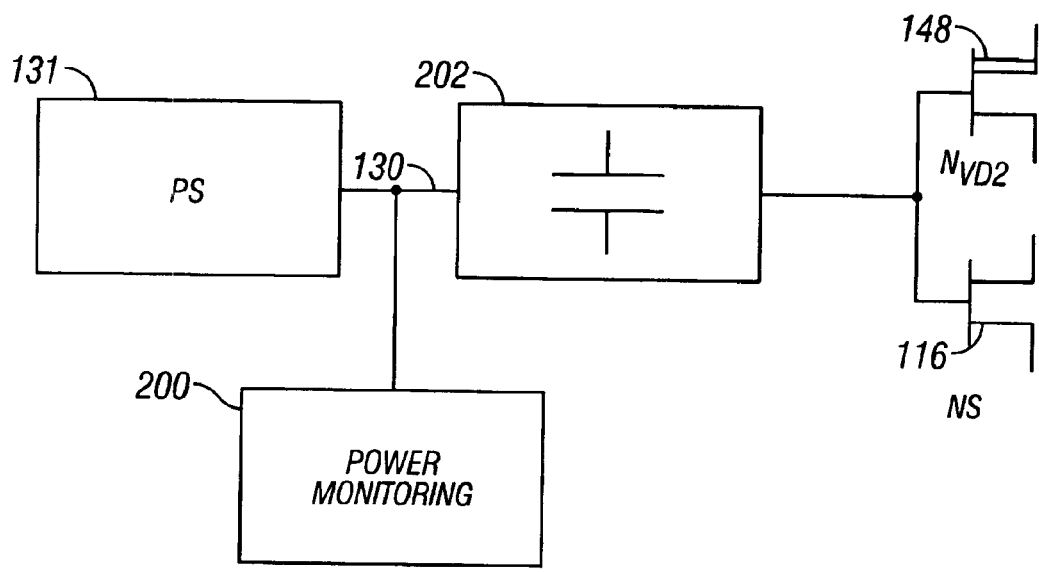
FIG. 2 shows a block diagram of a power monitoring embodiment.

A second embodiment is shown in block diagram form in FIG. 2. A hardware monitor device 200 monitors characteristics of the computer, including temperature, power supply level and other information. The device 200 produces a "power okay signal" when the power supply is up and running. This "power okay" signal is delayed by delay element 202 (e.g., a capacitor), and then drives the gates of $N_{VD2}$ and $N_S$ instead of the inverter 146 shown in the first embodiment.

Use of the power okay signal may help to isolate the real time clock well 100 from rail noise during a turn on sequence. For example, the hardware monitor could use a delay mechanism as shown, e.g., the power okay signal would only be produced after the power supply is stabilized. This keeps the real time well 100 isolated until the power supply is sufficiently stable.

Although not described in detail herein, other embodiments fall within the spirit and scope of the disclosed invention, as set forth in the appended claims.

What is claimed is:

1. An apparatus comprising:
   a real time clock circuit; and
   an associated circuit that operates in a first mode when a power supply voltage is present and operates in a second mode when battery power is present, said second mode providing a biasing condition that reduces a sub-threshold off current for the real time clock circuit during battery operation by adjusting source voltage levels for the real time clock circuit.

2. The apparatus of claim 1, wherein the associated circuit comprises one or more switching devices between source and substrate connections of the real time clock circuit.

3. The apparatus of claim 2, wherein the one or more switching devices comprise level shifting logic and one or more multiplexers.

4. The apparatus of claim 1, wherein said adjusting source voltage levels is performed using a battery providing the battery operation.

5. The apparatus of claim 4, further comprising resistors placed across the battery to form bias levels for the biasing condition, wherein said resistors are isolated from the battery during non-battery operation.

6. The apparatus of claim 1, further comprising a power supply ready signal that facilitates isolation of the real time clock circuit during transition from the second mode to the first mode.

7. The apparatus of claim 6, further comprising a delay element that delays the transition from the second mode to the first mode when transitioning back to use of the power supply voltage.

8. The apparatus of claim 7, wherein the delay element comprises a capacitor.

9. The apparatus of claim 1, further comprising decoupling capacitors that inhibit switching induced errors during transition between the first and second modes.

10. A personal computing system comprising:
    a core power source;
    core power rails coupled with the core power source;
    a real time clock circuit coupled with the core power rails;
    a battery coupled with the real time clock circuit; and
    a bias-mode control circuit that operates in a first mode when the core power source provides power, and operates in a second mode when the battery provides power, said second mode providing a biasing condition that reduces a sub-threshold off current for the real time clock circuit during battery operation by adjusting source voltage levels for the real time clock circuit.

11. The system of claim 10, wherein the bias-mode control circuit comprises one or more switching devices between source and substrate connections of the real time clock circuit.

12. The system of claim 11, wherein the one or more switching devices comprise level shifting logic and one or more multiplexers.

13. The system of claim 10, wherein said adjusting source voltage levels is performed using the battery.

14. The system of claim 13, further comprising resistors placed across the battery to form bias levels for the biasing condition, wherein said resistors are isolated from the battery during non-battery operation.

15. The system of claim 10, further comprising a power supply ready signal that facilitates isolation of the real time clock circuit during transition from the second mode to the first mode.

16. The system of claim 15, further comprising a delay element that delays the transition from the second mode to the first mode when transitioning back to use of the power supply voltage.

17. The system of claim 16, wherein the delay element comprises a capacitor.

18. The system of claim 10, further comprising decoupling capacitors that inhibit switching induced errors during transition between the first and second modes.

19. A system comprising:
a real time clock circuit for maintaining a count indicative of real time; and
source-voltage-level adjustment means for operating the real time clock circuit with reduced sub-threshold off current when battery power is present, and for allowing the real time clock circuit to communicate with other computing components when a regular power supply voltage is present.

20. The system of claim 19, wherein the source-voltage-level adjustment means comprises level shifting logic and one or more multiplexers.

21. The system of claim 19, further comprising transition-timing means for isolating the real time clock circuit during power source transitions.

22. The system of claim 19, further comprising capacitor means for inhibiting switching induced errors during power source transitions.

23. A method of operating a real time clock circuit, the method comprising:
operating a real time clock circuit from a power supply during a first mode of operation; and
operating said real time clock circuit from a battery during a second mode of operation that reduces a sub-threshold off current for the real time clock circuit by adjusting source voltage levels for the real time clock circuit.

24. The method of claim 23, wherein operating said real time clock circuit from a battery during a second mode comprises using the battery to perform the adjusting and using resistors placed across the battery to form bias levels for the adjusting, and wherein operating a real time clock circuit from a power supply during a first mode of operation comprises isolating the resistors from the battery during non-battery operation.

25. The method of claim 23, further comprising isolating the real time clock circuit during transition from the second mode to the first mode.

26. The method of claim 23, further comprising delaying transition from the second mode to the first mode when transitioning back to use of the power supply.

27. The method of claim 23, further comprising inhibiting switching induced errors using decoupling capacitors during transition between the first and second modes.

* * * * *